United States Patent
Marko et al.

(10) Patent No.: US 10,348,508 B2
(45) Date of Patent: Jul. 9, 2019

(54) SATELLITE RECEIVER OPTION FOR CERTIFICATE DISTRIBUTION

(71) Applicant: Sirius XM Radio Inc., New York, NY (US)

(72) Inventors: Paul Marko, Pembroke Pines, FL (US); Ashok Vadekar, Rockwood (CA); Richard Michalski, Coral Springs, FL (US); Mark Rindsberg, Boca Raton, FL (US)

(73) Assignee: Sirius XM Radio Inc., New York, NY (US)

( * ) Notice: Subject to any disclaimer, the term of this patent is extended or adjusted under 35 U.S.C. 154(b) by 99 days.

(21) Appl. No.: 15/510,893

(22) PCT Filed: Sep. 15, 2015

(86) PCT No.: PCT/US2015/050077
§ 371 (c)(1),
(2) Date: Mar. 13, 2017

(87) PCT Pub. No.: WO2016/044202
PCT Pub. Date: Mar. 24, 2016

(65) Prior Publication Data
US 2017/0288881 A1 Oct. 5, 2017

Related U.S. Application Data

(63) Continuation of application No. PCT/US2015/025830, filed on Apr. 14, 2015.
(Continued)

(51) Int. Cl.
*H04L 9/00* (2006.01)
*H04L 9/32* (2006.01)
(Continued)

(52) U.S. Cl.
CPC ........... *H04L 9/3263* (2013.01); *H01Q 21/28* (2013.01); *H04L 9/0866* (2013.01);
(Continued)

(58) Field of Classification Search
CPC ..... H04L 2209/84; H04L 9/32; H04L 9/3263; H04L 2209/601; H04L 63/06; H04L 69/164; H04L 9/0866
See application file for complete search history.

(56) References Cited

U.S. PATENT DOCUMENTS

| | | | |
|---|---|---|---|
| 9,094,206 B2 * | 7/2015 | Di Crescenzo | H04L 63/0869 |
| 9,147,294 B1 * | 9/2015 | Weinfield | G07C 5/008 |
| 2002/0107847 A1 | 8/2002 | Johnson | |

FOREIGN PATENT DOCUMENTS

| | | |
|---|---|---|
| RU | 2160196 C1 | 10/2000 |
| RU | 106194 U1 | 10/2011 |

OTHER PUBLICATIONS

International Search Report Application No. PCT/US2015/050077, Filing Date Sep. 15, 2015, dated Jan. 28, 2016.

* cited by examiner

*Primary Examiner* — Ghazal B Shehni
(74) *Attorney, Agent, or Firm* — Kramer Levin Naftalis & Frankel LLP (57) ABSTRACT

In exemplary embodiments of the present invention, a V2V unit in a vehicle (OBE) can, for example, store a plurality of years of encrypted certificates. The certificates can, for example, be programmed at an OBE factory using a secure server, and access to all certificates can be locked until an unlock key is computed for a given window (certificate validity period). An in-vehicle satellite receiver can then receive, over, for example, a dedicated satellite control channel, unlock codes for a current time window and a next time window, and provide them to the V2V device. Using those unlock codes, the V2V device (OBE) can compute an unlock key from an unlock code provided by the satellite receiver. In this manner an in-vehicle device may be directly messaged, but only to unlock one or more certificates at a controlled time. Without the received lock codes, the stored certificates are not useable.

19 Claims, 9 Drawing Sheets

Related U.S. Application Data

(60) Provisional application No. 62/050,751, filed on Sep. 15, 2014.

(51) Int. Cl.
*H04L 9/08* (2006.01)
*H01Q 21/28* (2006.01)
*H04W 12/08* (2009.01)
G08G 1/0967 (2006.01)
G08G 1/0968 (2006.01)

(52) U.S. Cl.
CPC .......... *H04L 9/0869* (2013.01); *H04L 9/0877* (2013.01); *H04L 9/32* (2013.01); *H04W 12/08* (2013.01); *B60R 2325/207* (2013.01); *G08G 1/0968* (2013.01); *G08G 1/096791* (2013.01); *H04L 2209/601* (2013.01); *H04L 2209/80* (2013.01); *H04L 2209/84* (2013.01)

FIG. 1
V2V Baseband IC or Security IC Fabrication

Step 1
V2V Chipset
Fabrication

SCMS Proxy → vid, vk, gid → Base Band Security IC

V2V IC

- Security Credential Management System securely provides the V2V chip with:

(i) a unique ID (V2V ID) called the vid;
  (ii) a unique secret key called the vk; and
  (iii) a group id (which may be arbitrary or a function of vid).

- These credentials can be stored in OTP, on-chip Flash, or in-package NVM during the IC test process.

FIG. 2
V2V Module (OBE) Production

Step 2
V2V Module
Production

- OBE provides its previously loaded identity and credential seed information
  - The credential seed information is the function that relates sequential private keys used to generate the public keys in the certificates themselves
- The SCMS provides multiple sets of encrypted certificates with time-specific validity windows to the V2V module (OBE)
  - There are "w" encrypted sets of certificates for w windows, with the number of certs per window TBD (e.g., 20 per window) : [{certs, 1..20},w]
  - Compute the set of associated lock/unlock keys = $[F_v(vk, F_s(gc_{wg}, vid)), w]$
    • The key needed to encrypt each set of certs is $F_v()$
    • Recall $F_v$ is a Key Derivation Function of $F_s$ and vk
    • Recall also that $F_s$ is a Key Derivation Function of ...
      - $gc_{wg}$ (which changes every period and is used by all devices in the same group) and
      - vid (which is unique to a specific V2V device and never changes)
  - Encrypt each cert set with the associated key... $E(F_v(vk, F_s(gc_{wg}, vid)), \{certs, 1..20\})$
  - Deliver complete dataset containing all the encrypted sets of certs for storage in V2V module
    $[E(F_v(vk, F_s(gc_{wg}, vid)), \{certs, 1..20\}), w]$ FIG. 3
Vehicle Start-up

- The SDARS receiver gets the V2V identity (vid) and group identity (gid) from the V2V module (OBE) at power up, and stores this in NVM
  - The SDARS Receiver needs the vid and gid to parse the gc messages and extract the group codes to be passed to the V2V device (or not passed in the case of rogue vids)
- The SDARS receiver can reregister with a different V2V device ID (vid), which will cause the SDARS device to reinitialize the extraction.

FIG. 4
Field Operation

FIG. 5
Unique Unlock Code Derivation

FIG. 6
Encrypt/Decrypt Key Derivation

FIG. 7
Certificate Bundling and Encryption

SATELLITE RECEIVER OPTION FOR CERTIFICATE DISTRIBUTION

CROSS REFERENCE TO RELATED APPLICATIONS

This application is a United States national phase filing of international application number PCT/US2015/050077, filed on Sep. 15, 2015, which claims priority to, and the benefit of, each of: (i) U.S. Provisional Patent Application No. 62/050,751, entitled "SATELLITE RECEIVER OPTION FOR CERTIFICATE DISTRIBUTION", filed on Sep. 15, 2014, and (ii) PCT Patent Application PCT/US2015/025830, entitled "SYSTEMS, METHODS AND APPLICATIONS FOR USING AND ENHANCING VEHICLE TO VEHICLE COMMUNICATIONS, INCLUDING SYNERGIES AND INTEROPERATION WITH SATELLITE RADIO", filed on Apr. 14, 2015, each of which is hereby incorporated herein by reference.

TECHNICAL FIELD

The present invention relates to communications between vehicles, between vehicles and infrastructure, and between satellites and vehicles, said communications generally known as "V2X" communications, and more particularly to systems, methods and applications for distributing encrypted certificates to vehicles over a satellite broadcast channel and decoding them in a Vehicle to Vehicle ("V2V") device.

BACKGROUND OF THE INVENTION

The present invention addresses a need in the burgeoning area of Vehicle to Vehicle ("V2V") communications. A primary path for delivering certificates to V2X (i.e., Vehicle to Vehicle, or "V2V", and Vehicle to Infrastructure, "V2I", communications) On-Board Equipment ("OBE") is via Road Side Units ("RSU"). However, an alternate delivery path will be necessary if RSUs are not available. This unavailability can occur, for example, (i) during an initial rollout phase while RSUs are not widespread, or, for example, (ii) in remote locations where RSUs will not be present until system buildout is complete. It may also occur where RSUs are in place, but for whatever reason are inoperable, broken, or otherwise nonfunctioning in a given locale. If such a locale is remote, if a few, or even one RSU is down, that can seriously affect V2I communications.

SUMMARY OF THE INVENTION

In exemplary embodiments of the present invention, a V2V unit in a vehicle (OBE) can, for example, store a plurality of years of encrypted certificates. The certificates can, for example, be programmed at an OBE factory using a secure server, and access to all certificates can be locked until an unlock key is computed for a given window (certificate validity period). An in-vehicle satellite receiver can then receive, over, for example, a dedicated satellite control channel, unlock codes for a current time window and a next time window, and provide them to the V2V device. Using those unlock codes, the V2V device (OBE) can compute an unlock key from an unlock code provided by the satellite receiver. In this manner an in-vehicle device may be directly messaged, but only to unlock one or more certificates at a controlled time. Without the received lock codes, the stored certificates are not useable.

BRIEF DESCRIPTION OF THE DRAWINGS

It is noted that the U.S. patent or application file contains at least one drawing executed in color. Copies of this patent or patent application publication with color drawings will be provided by the U.S. Patent Office upon request and payment of the necessary fee.

The invention will be more readily understood with reference to various exemplary embodiments thereof, as shown in the drawing figures, in which.

DETAILED DESCRIPTION OF THE INVENTION

In exemplary embodiments of the present invention, a V2V unit provided in a vehicle (OBE) can, for example, store 20 or more years of encrypted certificates. The certificates can, for example, be programmed at an OBE factory using a secure server, and access to all certificates can be locked until an unlock key is computed for a given temporal window (certificate validity period). A dedicated satellite control channel can, for example, provide unlock codes for each of a current time window and a next time window. Using those unlock codes the V2V device (OBE) can compute the unlock key from an unlock code provided by the satellite receiver. Various details of this process are next described with reference to FIGS. 1-7.

1. Satellite Certificate Distribution
Proposed Satellite Delivery Option

In exemplary embodiments of the present invention, a satellite channel may be used to facilitate unlocking of pre-stored certificates.

It is noted that delivery of the certificates themselves over satellite broadcast would generally exceed available bandwidth. Thus, in exemplary embodiments, a V2V unit (OBE)

can, for example, store 20+ years of encrypted certificates. The certificates can, for example, be programmed at an OBE factory using a secure server, and access to all certificates can be locked until an unlock key is computed for a given window (certificate validity period). A dedicated satellite control channel can provide unlock codes for a current time window and a next time window. Using those unlock codes the V2V device (OBE) can compute the unlock key from an unlock code provided by the satellite receiver.

In exemplary embodiments of the present invention, the satellite control channel can further shut down disbursement of unlock codes to rogue V2V units (OBE). It is noted that in some embodiments unlock codes need only be requested from a satellite receiver if a relevant Roadside Unit (RSU) is not available. In other embodiments it may be just as efficient to simply use the satellite channel as the primary source of unlock codes.

2. Nomenclature Key/Explanation

The following nomenclature is used in the present disclosure.

Lowercase letters represent values such as, for example:
w—a time period (window) over which a set of certificates is valid, such as, for example, w ranges from 1 to 1040 for a 20 years, where w refers to a week;
vid—system-assigned unique ID for each V2V chip;
vk—system-assigned unique (symmetric) key for each V2V chip;
gid—a system-assigned group identifier (gid has values from {0 to 255}) assigned to each V2V chip; this can be, for example, a simple function of vid, such as the lower 8 bits of a vid;
and
[obj,range]—an array of objects over a defined range; alternatively [obj] for an array of objects with undefined range.

Upper case letters represent functions such as, for example:
E(k,po)—the encryption of a "plaintext object" (po) to produce an encrypted object using a key (k);
D(k,eo)—the decryption of an "encrypted object" (eo) using a key (k);
S(k,o) the signing of an object using a key (k);
$F_s$(key,params . . . )—a Key Derivation Function (KDF) operating on a key with parametric inputs known to the SDARS unit and the system infrastructure for differentiating a group unlock key into a vid-specific unlock code; and
$F_v$(key,params . . . )—a Key Derivation Function (KDF) operating on a key with parametric inputs known to the V2V chip and the system infrastructure for differentiating a vk into a period-specific unlock key.

In exemplary embodiments of the present invention, a dedicated satellite control channel can provide unlock codes for at least a current time window and a next time window. The Satellite Control Channel can also shut down unlock code disbursement to rogue V2V units (OBE).

In some embodiments, unlock codes are requested from an SDARS receiver only if the relevant RSU is unavailable. In other embodiments it may be just as efficient to simply use the satellite channel as the primary source of unlock codes.

In either scenario, the V2V device (OBE) can compute the unlock key from the unlock code provided by the SDARS receiver, as described more fully below.

3. Group Code Management

In some embodiments, group codes (gc) may be delivered over the air, and used in the satellite device to compute vid specific unlock codes. The vid specific codes are then used to derive the unlock key to decrypt certificate sets in the V2V device.

During window i (w=i), a satellite, or SDARS broadcaster, such as, for example, Sirius XM Radio, can transmit $gc_{ig}$ and also $gc_{(i+1)g}$ for g=1 to n (the number of groups):
Option 1: Computed group unlock codes for a particular group (g) using a function:
Computing power instead of memory;
$GC(gid,w)=gc_{wg}$
for w=1 to max number of periods.
Option 2: Arbitrary table of group unlock codes for group g
Memory at SCMS used instead of computing power;
$gc_{1g}$="random code 1"
$gc_{2g}$="random code 2"

FIGS. 1-4, next described, illustrate a four-step process from initial storage of the certificates through receipt of revoked vids and group codes over the satellite channel by the SDARS Module and computation and delivery of vid-specific unlock codes to the V2V Module. These steps include (1) V2V Chipset Fabrication, (2) V2V Module Production, (3) Power Up and (4) Operation.

4. V2V Baseband IC or Security IC Fabrication

Figure 1:
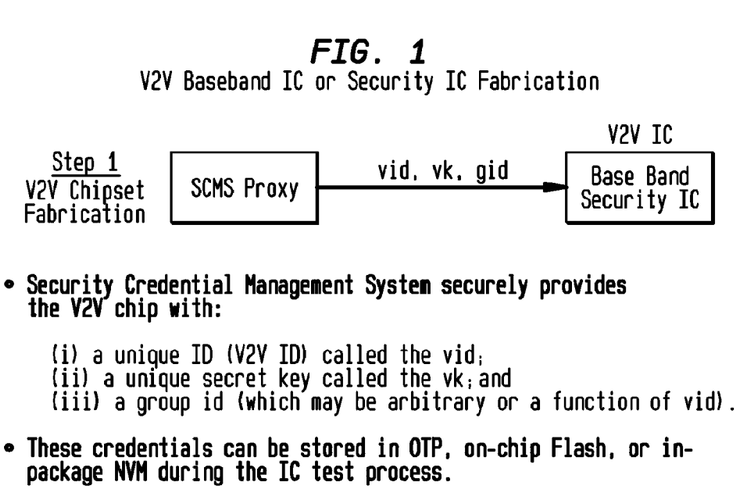
FIG. 1 illustrates V2V Chipset Fabrication according to an exemplary embodiment of the present invention.

FIG. 1 illustrates V2V baseband IC or security IC fabrication. As shown, a Security Credential Management System can at chipset fabrication, for example, securely provide the V2V chip with:
(i) a unique ID (V2V ID) called the vid;
(ii) a unique secret key called the vk; and
(iii) a group id (which may be arbitrary or a function of the vid).

These credentials are stored, for example, in OTP, on-chip Flash, or in-package non-volatile memory ("NVM") during an IC test process, for example. The V2V Module has a Baseband IC, an RF IC and Flash memory connected to the Baseband IC, as shown.

5. V2V Module (OBE) Production

Figure 2:
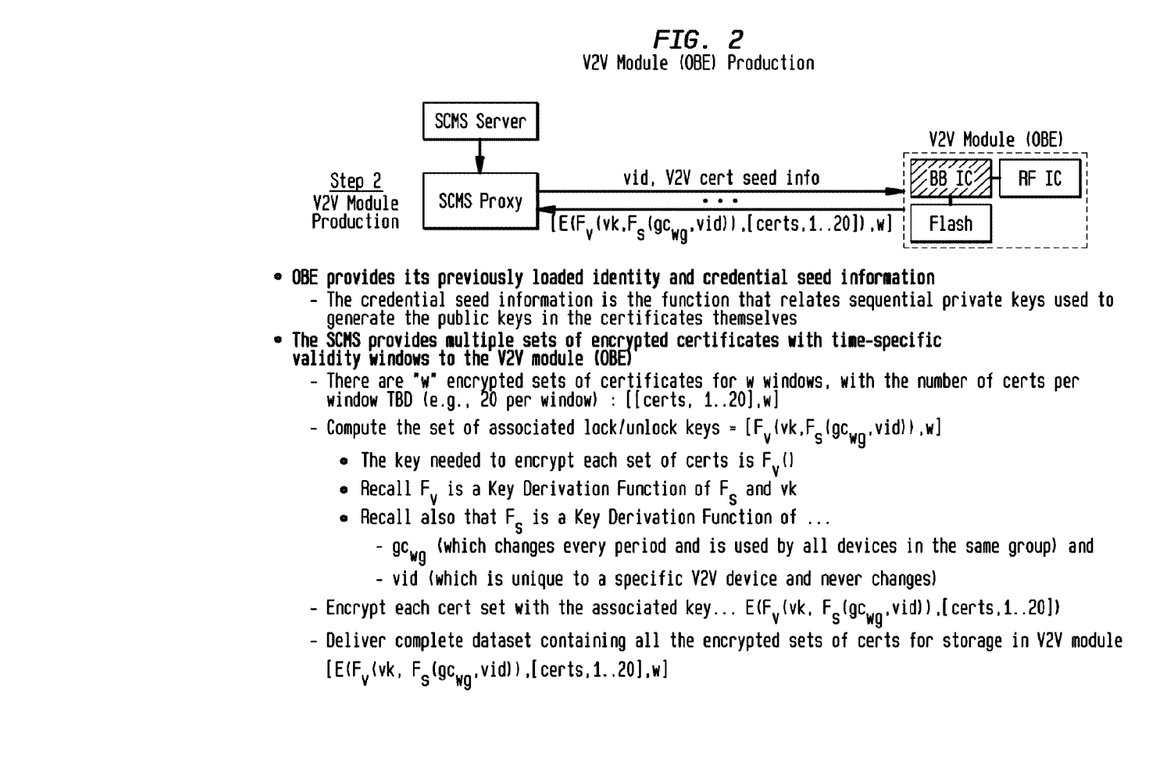
FIG. 2 illustrates V2V Module Production according to an exemplary embodiment of the present invention.

FIG. 2 illustrates V2V Module (OBE) Production. As shown in FIG. 2, the OBE can provide its previously loaded identity, the vid, and credential seed information, which is stored in its Baseband IC, as shown, to an SCMS Proxy connected to an SCMS Server. The credential seed information is the function that relates sequential private keys used to generate the public keys in the certificates themselves.

In response, the SCMS provides multiple sets of encrypted certificates with time-specific validity windows to the V2V module (OBE). It is noted that there can be "w" encrypted sets of certificates for w windows, with the number of certificates per window TBD (e.g. 20 per window):[[certs,1 . . . 20],w].

The SCMS can compute the set of associated lock/unlock keys=$[F_V(vk,F_S(gc_{wg},vid)),w]$, where:
the key needed to encrypt each set of certs is $F_V(\ )$; and
$F_V$ is a Key Derivation Function of $F_S$ and vk.

It is further noted that $F_S$ is a Key Derivation Function of:
(i) $gc_{wg}$ (which changes every period and is used by all devices in the same group); and (ii) vid (which is unique to a specific V2V device and never changes).

The SCMS encrypts each cert set with the associated key:
$E(F_V(vk, F_S(gc_{wg},vid)),[certs,1 . . . 20])$
and delivers a complete dataset containing all the encrypted sets of certificates for storage in the V2V module:
$[E(F_V(vk, F_S(gc_{wg},vid)),[certs,1 . . . 20]),w]$ to the V2V module, as shown.

6. Vehicle Start-Up

Figure 3:
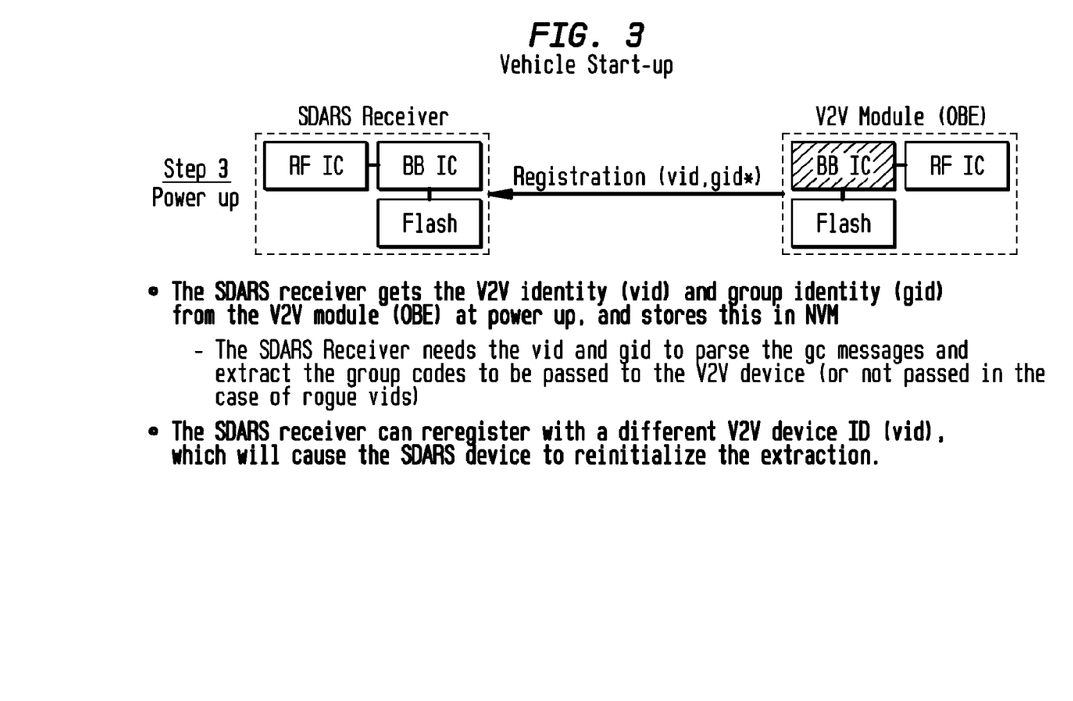
FIG. 3 illustrates processes that occur in and between an exemplary V2V module and a SDARS receiver at vehicle start up/power-up according to an exemplary embodiment of the present invention.

FIG. 3 illustrates events that occur upon vehicle start-up. Shown is an SDARS Receiver having an RF IC, a Baseband IC, and a Flash Memory connected to said Baseband IC. The SDARS receiver receives the V2V identity (vid) and group identity (gid) from the V2V module (OBE) at power up, and stores this in non-volatile memory ("NVM"). The SDARS Receiver needs the vid and gid to parse the gc messages and extract the group codes to be passed to the V2V device (or not passed, in the case of rogue vids).

In exemplary embodiments of the present invention, the SDARS receiver can reregister with a different V2V device ID (vid), which will cause the SDARS device to reinitialize the extraction.

7. Field Operation

Figure 4:
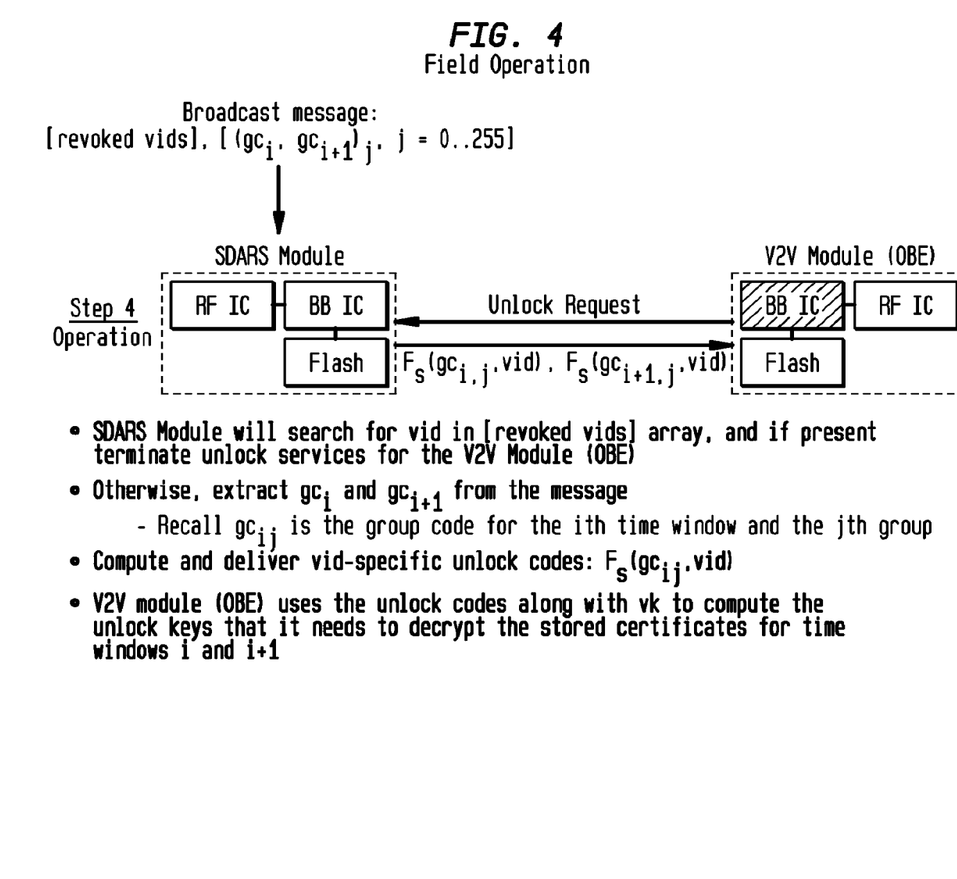
FIG. 4 illustrates exemplary in the field interactions between the SDARS receiver and the exemplary V2V Module of FIG. 3 according to an exemplary embodiment of the present invention.

FIG. 4 illustrates exemplary field operations. The SDARS Module receives a Broadcast message from a satellite. The message contains a [revoked vids] array and group codes. The SDARS Module will search for the V2V Module supplied vid in the [revoked vids] array, and if present, can terminate unlock services for the V2V Module (OBE). Otherwise, the SDARS module can extract group codes for two time windows $gc_i$ and $gc_{i+1}$ from the broadcast message (recalling that $gc_{ij}$ is the group code for the $i^{th}$ time window and the $j^{th}$ group).

The SDARS module can then compute and deliver vid-specific unlock codes:

$F_S(gc_{ij},\text{vid})$.

The V2V module (OBE) can, for example, then use the unlock codes $F_S(gc_{ij},\text{vid})$ along with vk to compute the unlock keys that it needs to decrypt the stored certificates for time windows i and i+1, allowing it access to these certificates.

8. Satellite Bandwidth Estimates

In exemplary embodiments of the present invention, a validity list (list of valid vids) maybe transmitted along with the group codes. A validity list consists of 1 status bit per vid (e.g. 0=valid, 1=revoked) in sequential vid order such that vid status is identified by bit position in the list. Because most (generally >95%) of the vids are valid, the vid list may be substantially compressed for transmission. The compressed vid list may then be stored in the SDARS receiver. In exemplary embodiments of the present invention, the validity list may be transmitted as one large file including all vids and all group codes or as several files with one group code and the set of vids for that group in each file. The following are exemplary bit usage, compression and requisite satellite on-time, for an exemplary embodiment of the present invention:

Example Control Channel Fields Bit Usage
Extraction Data Field 32 bit start vid
   32 bit vid field length
   32 bit compression parameters
vid Field 350,000,032 bits (one bit/vid=350 M cars+ MAC)
unlock code Field 131,072 bits (256 groups×256 bit code×2 w)
Total Control Channel 350,131,168 bits
vid Field Compression (1 per Year Revocation Rate)

| Revocation Period | Probability | Avg Entropy | Compression |
|---|---|---|---|
| 1 Yr | 1% | 0.08 | 0.12 |
| 3 Yr | 3% | 0.19 | 0.24 |
| 5 Yr | 5% | 0.29 | 0.33 |

Radio On-Time to Receive Group Code (3 Year Revocations, Monthly Updates)
Compressed Control Channel=84,131,200 bits

| SAT Bandwidth Used | Receiver On Time |
|---|---|
| 32 kbps | 44 Min./Mo. |
| 64 kbps | 22 Min./Mo. |

It is noted that due to the encoding algorithm, the number of minutes listed above refers to cumulative or aggregate vehicle "on time" in any order or grouping (such as, for example, a separate "on time" of 5 min, 12 min, 9 min, 4 min, 13 min, and 1 min is sufficient for the first example of 44 minutes).

9. Exemplary Infrastructure Resource Estimates

A. Database Cost (Persistent)
Device records—[(vid,vk),1 . . . 300 million plus]
Assuming 32 bit V2V ID, and 300 million devices, 6 GB of persistent storage is required.
Either:
(i) 1 master secret from which [gc,(gid,w)] expands into group keys for all gid and time windows via FG(master secret,(gid,w)) which is a trivial amount of storage; or alternatively,
(ii) unrelated group key records [[gc,0 . . . 255], all time periods] which is less than 1 MB.

B. Database Cost (Ephemeral) [[certs,precomputed w],vid] for devices (and over all time periods) not yet delivered
All certs for each vid from the time of creation to the time of delivery to the V2V device . . . assuming 1.5 million radios produced per month retaining certs for 1 month would require ~6 GB of storage.

10. OBE Memory Resource Estimates

OBE Flash Memory for Certificate Storage:

20 years of certificates×20 certificates/week×64 bytes/certificate=1.33 Mbytes.

It is here noted that it is very likely that a given OBE will already have Flash memory on-board that could potentially be used for certificate storage. If a separate Flash device is desired to store certificates, the following are typical automotive grade NOR Flash costs at >1 MU:
2 Mbytes=$0.58
4 Mbytes=$0.85
8 Mbytes=$1.10

Figure 5:
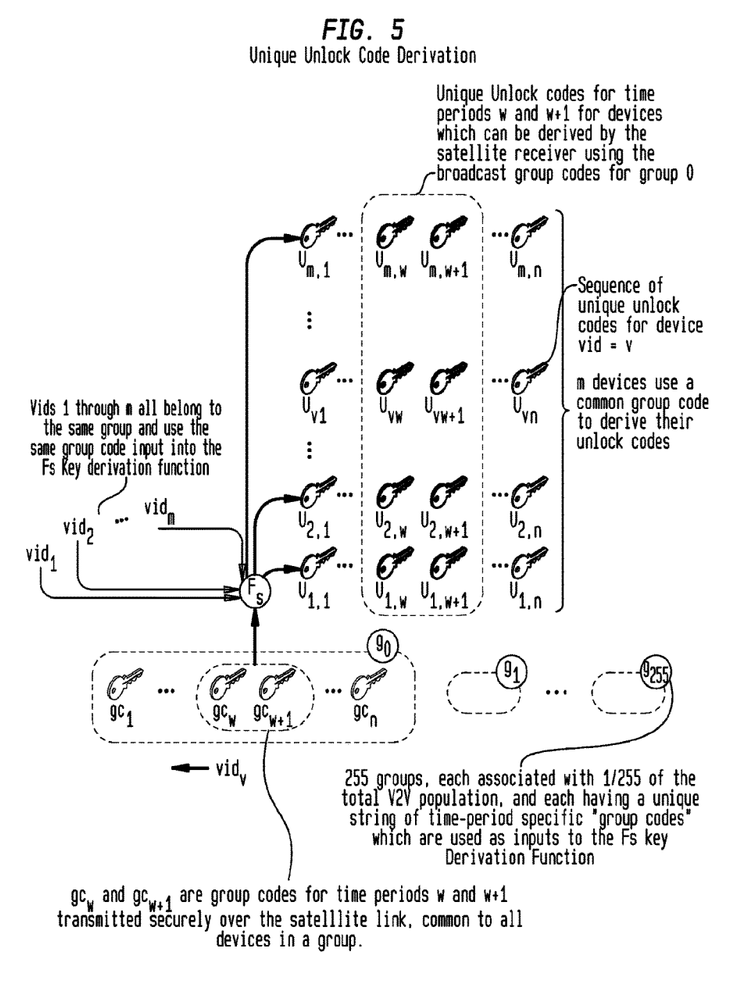
FIG. 5 illustrates how unique unlock codes for time periods w and w+1 for devices can be derived by an exemplary satellite receiver using broadcast group codes, according to an exemplary embodiment of the present invention
Figure 6:
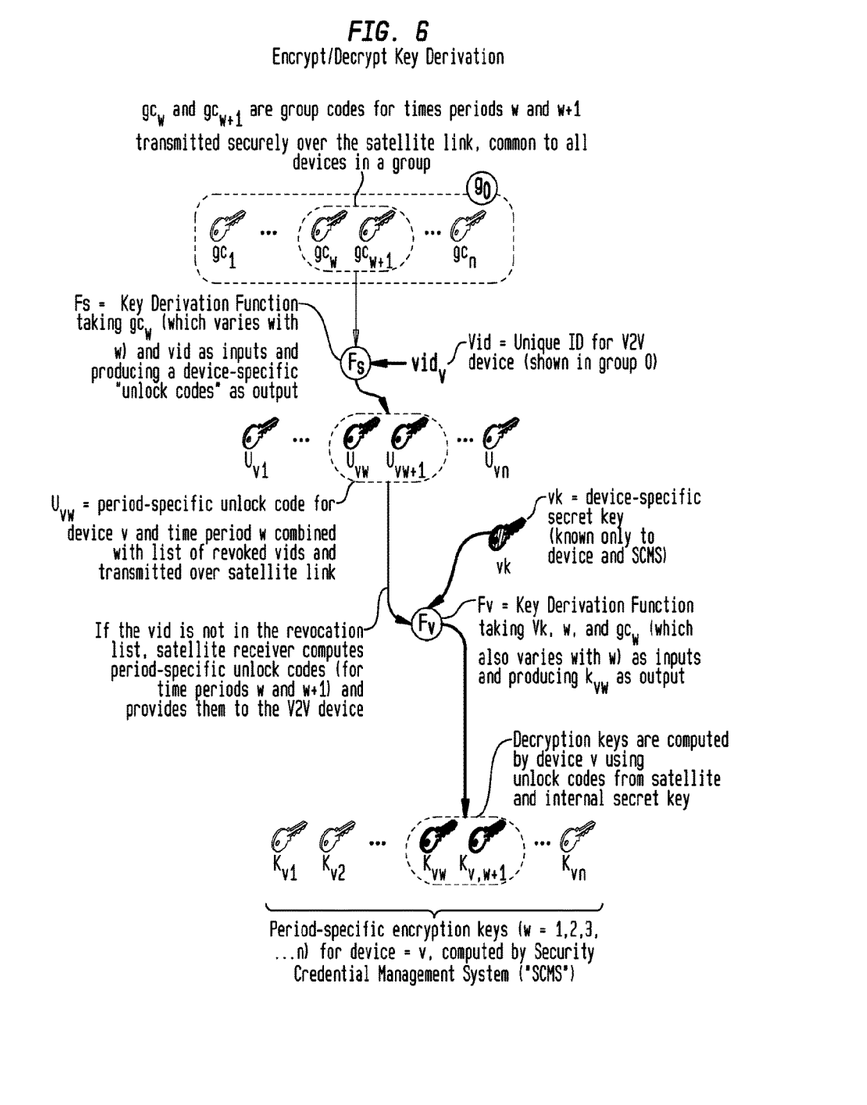
FIG. 6 illustrates Encrypt/Decrypt Key Derivation according to an exemplary embodiment of the present invention.
Figure 7:
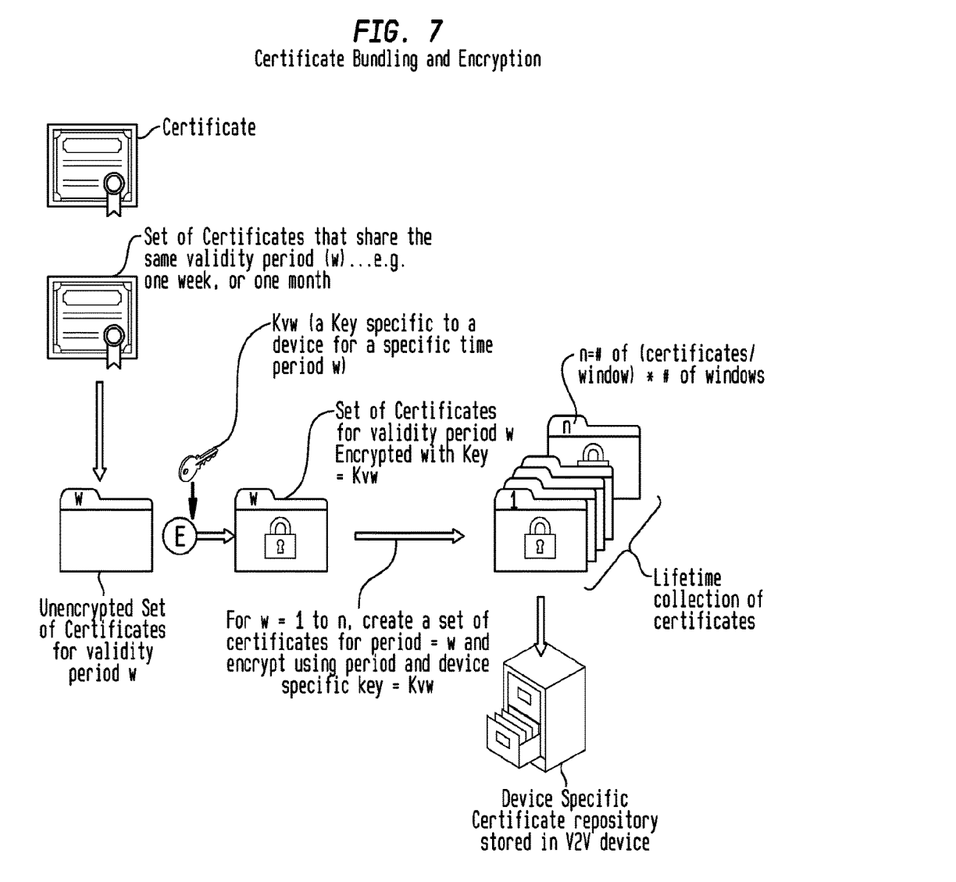
FIG. 7 illustrates Certificate Bundling and Encryption according to an exemplary embodiment of the present invention.

FIGS. 5-7, next described, illustrate various details of the unlock code derivation, encrypt/decrypt key derivation, and certificate bundling and encryption processes, according to an exemplary embodiment of the present invention.

11. Unique Unlock Code Generation

FIG. 5 illustrates how unique unlock codes for time periods w and w+1 for devices can be derived by an exemplary satellite receiver using the broadcast group codes, according to an exemplary embodiment of the present invention. This allows the satellite broadcast system, or transmitter to only need send group codes, as opposed to individually messaging actual devices $vid_1$, $vid_2$, . . . $vid_m$, etc.

As noted above, the unlock codes are expressed as $F_S(gc_{ij},\text{vid})$. As shown in FIG. 5, Vids 1 through m, associated with m V2V devices, all belong to the same group, and use the same group code input to the Fs Key derivation function. Unique Unlock codes for time periods w and w+1 for devices 1 to m can be derived by the satellite receiver using the broadcast group codes for group 0, as shown. The unlock keys are shown in an array of blue keys in FIG. 5, where each row represents a sequence of unique Unlock codes for device vid=v. The m V2V devices use a common group code to derive their unlock codes, as shown. As shown at the bottom of FIG. 5, the group codes $g_0, g_1 \ldots g_{255}$ are shown in yellow. Thus, $gc_w$ and $gc_{w+1}$ are group codes for time periods w and w+1 that are transmitted securely over the satellite link, common to all devices (m devices) in a group. There are 255 groups in total, each group associated with $\frac{1}{255}$ of the total V2V population, and each having a unique string of time-period specific "group codes" which may be used as inputs to the Fs Key Derivation Function. At the bottom left of FIG. 5 is shown $vid_v$ which is a member of group 0 (containing devices 1 through m overall) and thus its Unique Unlock codes are extracted as illustrated at the top of FIG. 5.

12. Encrypt/Decrypt Key Derivation

FIG. 6 illustrates exemplary process flow for obtaining period specific encryption keys for an exemplary device, according to an exemplary embodiment of the present invention. Beginning at the top of FIG. 5, once the g0 group codes $gc_w$ and $gc_{w+i}$, (shown in yellow), being group codes for time periods w and w+1 that are transmitted securely over the satellite link, common to all devices (m devices) in a group, are derived, as shown in FIG. 5, the Key Derivation Function, Fs is used. This takes group code $gc_w$ (which varies with w) and vid as inputs, and produces device-specific and period specific "unlock codes" as output.

Uvw is a period-specific unlock code for (i) device v and (ii) time period w, combined with (iii) a list of revoked vids and transmitted over a satellite link, as shown. The various Uvws are shown in blue in the center of FIG. 6. As noted, if the vid is not in the revocation list, the satellite receiver can compute period specific unlock codes (say for time periods w and w+1) and provide these time-specific unlock codes to the V2V device. As shown at node Fv in the center of FIG. 6. These time-specific unlock codes $U_{vw}$ and $U_{vw+1}$ are used as inputs to Fv, a Key Derivation Function that takes Vk, w and $gc_w$ (which also varies with time w) as inputs and produces a unique to V2V device set of decryption keys $k_{vw}$ as an output. Input vk is the device-specific secret key (as shown in FIG. 1), known only to the V2V device having a given vid, and the Security Credential Management System, SCMS. Therefore, decryption keys Kv1 through Kvw, Kv,w+1 and on through Kvn, shown in red at the bottom of FIG. 6, are computed by the V2V device v using the unlock codes from the satellite (Uv1 through Uvw, Uvw+1, . . . Uvn) and its internal secret key $v_k$.

By this process, in exemplary embodiments of the present invention, certificates can be securely stored on any V2V device, and only activated by sending a Broadcast message (as shown in FIG. 4) to a Satellite Module containing group codes. The group codes work for any of m devices in a group, to optimize the use of satellite bandwidth. The Satellite Module in the vehicle with the V2V Module extracts the group codes $gc_w$ and $gc_{w+1}$ for a given two time periods, w and w+1, for example, and outputs V2V device specific unlock codes Uvw, Uvw+1 and then delivers these to the V2V Module. Using unlock codes Uvw and Uvw+1 along with its secret code vk, the V2V Module computes the unlock keys, or decryption keys Kvw and Kv, w+1, needed to decrypt the stored certificates for time periods w and w+1. By repeating the process of FIGS. 1-6, multiple certificates may be activated for any given V2V device.

13. Certificate Bundling and Encryption

Finally, FIG. 7 illustrates exemplary process flow for creating a lifetime collection of certificates and storing them in a Device Specific Certificate Repository in an exemplary V2V device.

The process begins with a Set of Certificates that share the same validity period (w), such as, for example, one week, or one month. From this set an Unencrypted Set of Certificates for validity period w is encrypted with a device specific Key Kvw, specific to a device for a specific time period w. By this process a set of N certificates, where N=(number of certificates per window)*(number of windows), may be created for time periods w=1 to w=N, by encrypting using the period and device specific key Kvw. The N certificates, shown as a "lifetime" collection of certificates, may be stored in the V2V device in a Device Specific Certificate Repository, as shown at the bottom right of FIG. 7.

It is noted that in alternate exemplary embodiments, an essentially similar technique can be used where the Broadcast message of FIG. 4 is sent not by satellite, but rather via a cellular network, or other communications network to a vehicle having an integrated V2V and other communications pathways antenna and communications system. Such an exemplary embodiment is shown, for example in FIGS. 8A and 8B, next described. This pathway can, for example, be a backup used by the SDARS system, for example, when satellite bandwidth is unavailable, or for other reasons sending by satellite is not preferred or optimal in any given context. SDARS systems generally have integrated Satellite and IP network communications ability, so this affords redundancy and backup functionality. It is here noted that how the Broadcast message is sent to the Satellite Module (and then the appropriate unlock codes are passed to the V2V device is not important), the key being to get the Broadcast Message to the Satellite Module and allow it to be processed. In the alternate exemplary embodiment of FIGS. 8A and 8B, for example, the Broadcast Message may simply be forwarded to the SDARS Module, and then processed identically as shown in FIG. 4, the alternate communications pathway simply allowing for the message's delivery.

Figure 8A:
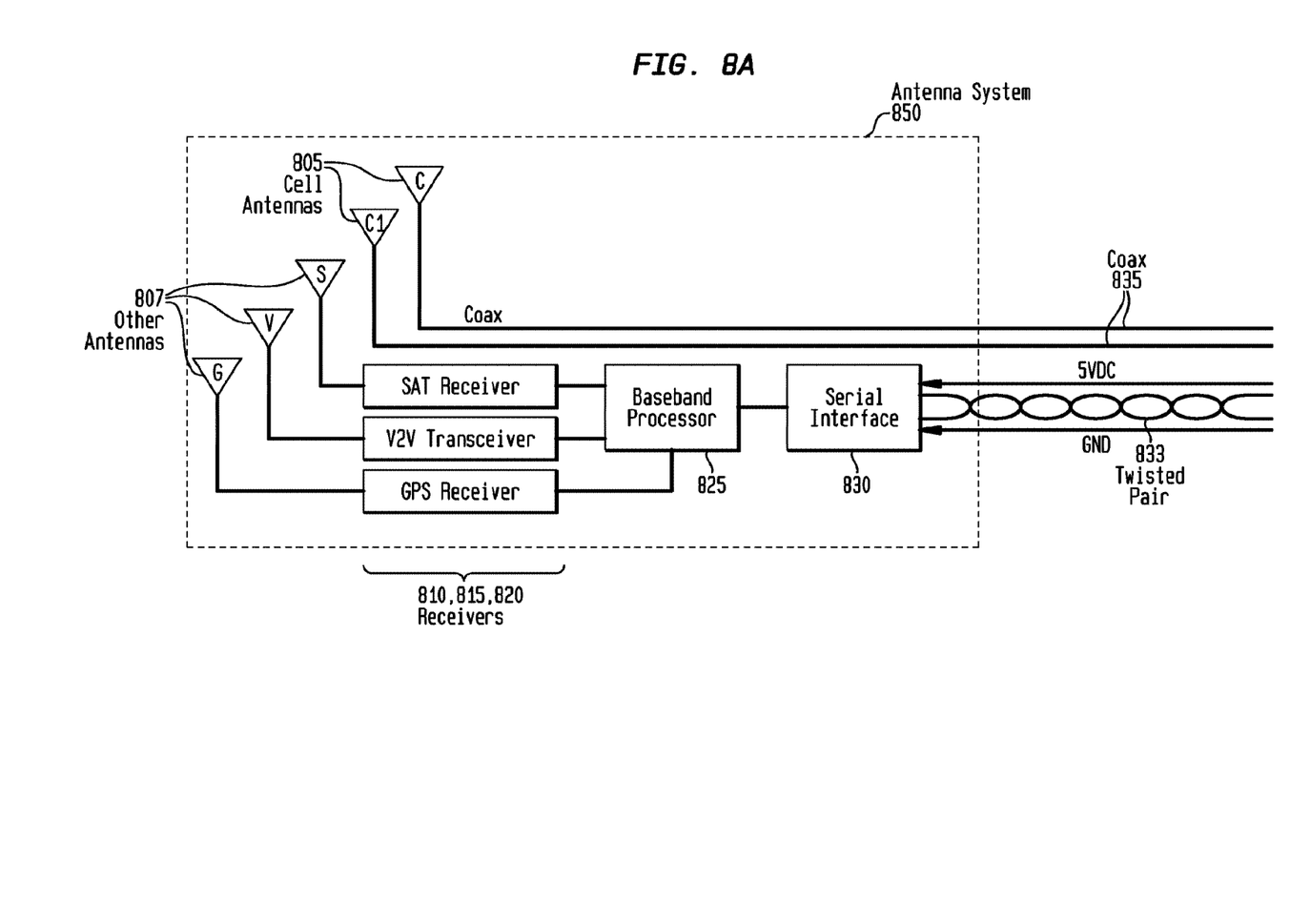
FIG. 8A illustrates an exemplary integrated SAT Radio and V2V antenna system, which may be used in an alternate exemplary embodiment of the present invention wherein the Broadcast message sent by the satellite service is sent over an alternate communications pathway.
Figure 8B:
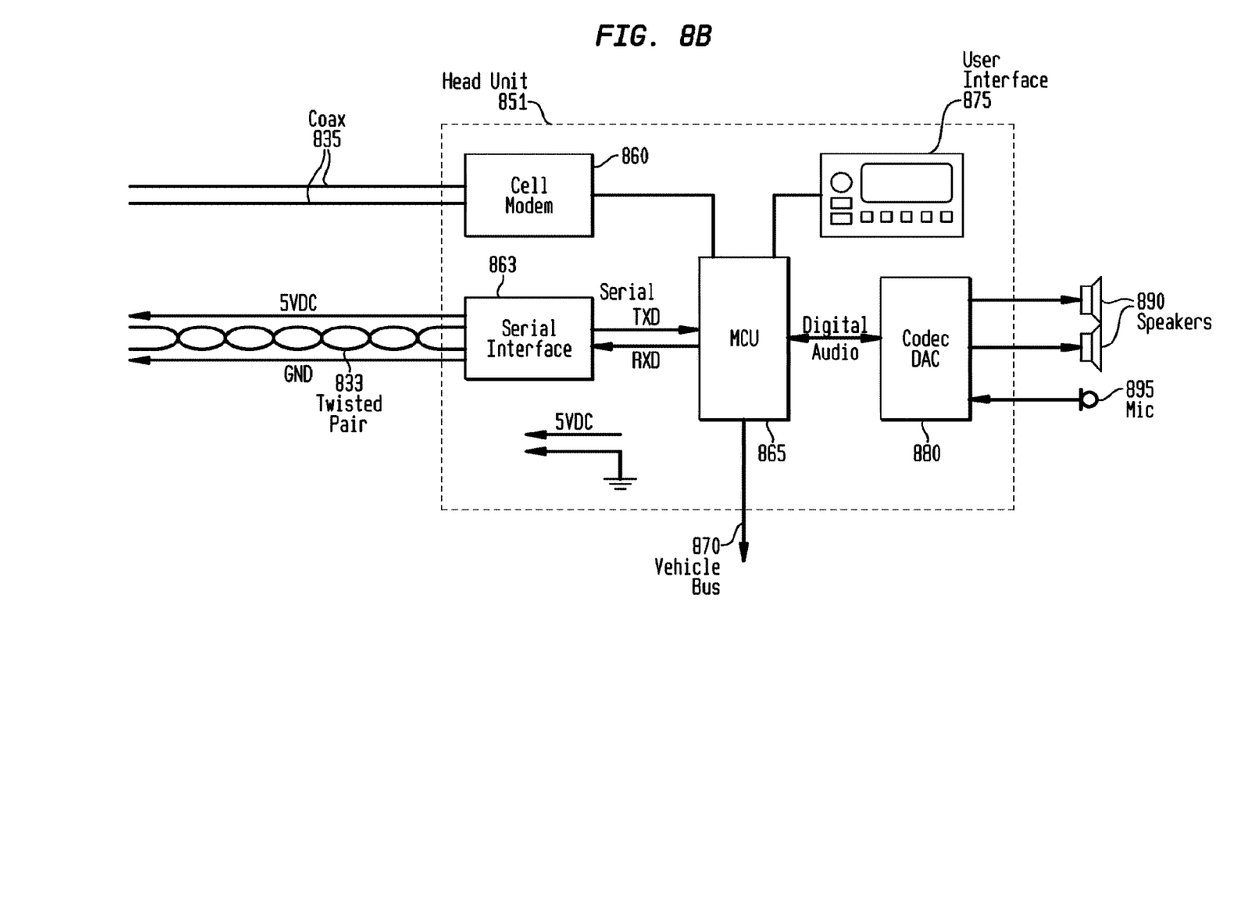
FIG. 8B illustrates an exemplary Head Unit, designed to receive signals from the exemplary antenna system of FIG. 8A, according to said alternate exemplary embodiment of the present invention.

In such alternate exemplary embodiments of the present invention, a satellite radio and V2V antenna system may be integrated not just as shown in FIGS. 1-4, but also with other communications capabilities, as shown in FIGS. 8A and 8B. As shown in FIG. 8A, an antenna system includes multiple passive antenna elements to support frequency bands used by the antenna system, here C, C1, S, V and G. C and C1 illustrate Cell Antennas 805, and the S, V and G antennas being the Other Antennas 807, receiving frequencies outside the cellular communications bands. The Other Antennas 807 are respectively fed into the receivers. For example, antenna element S is tuned to receive satellite radio transmissions in the 2.3 GHz frequency band and may thus be connected to the SAT receiver 810. The SAT receiver processes the RF signals received from the antenna and outputs baseband digital signals to the Baseband Processor 825. Similarly, antenna element V is tuned to the 5.9 GHz frequency band to transmit and receive V2V signals and is connected to the V2V Transceiver 815. The V2V transceiver contains both a receiver portion to process the V2V signals received from the V antenna element and a transmitter portion coupled to the same antenna element for transmitting V2V signals. The V2V Transceiver is also connected to the Baseband Processor 825, which receives baseband digital signals from the receiver portion of V2V Transceiver and sends baseband digital signals to the transmitter portion. Continuing with reference to FIG. 8A, antenna element G is tuned to the 1.6

GHz band to receive GPS and/or GLONASS positioning signals and is connected to the GPS Receiver 820. GPS Receiver 820 processes the RF signals received from the G antenna element, and outputs baseband digital signals to the Baseband Processor 825. Optionally, cell antennas C and C1 can be tuned to cellular frequency bands to support cellular communications. The C and C1 antenna elements may be coupled to a remote cellular modem through coaxial transmission lines Coax.

With continued reference to FIG. 8A, the Baseband Processor may perform additional operations on the data received from SAT, V2V and GPS paths, such as, for example, parsing the data streams, managing conditional access policies, preprocessing services, and formatting and multiplexing the resultant service data into a composite serial bitstream which can then, for example, be transmitted over the bidirectional serial Interface 830 to the Head Unit, shown in FIG. 8B. The Serial Interface supports multiplexed digital transmissions from the Antenna System 850 to the Head Unit 851 and from the Head Unit 851 to the Antenna System 850. In exemplary embodiments of the present invention, Baseband Processor 825 can support a V2V security policy which may require information received by the SAT Receiver 810.

In exemplary embodiments of the present invention, administering a security policy in the tightly integrated Antenna System 850 can reduce observability of sensitive security data by unauthorized third parties. This provides a level of protection against misuse of the V2V system.

As noted, an exemplary Head Unit 851, designed to receive signals from Antenna System 850, is shown in FIG. 8B. Head Unit 851 can incorporate a MCU 865 for communicating with internal and external vehicle systems and which provides an interface for communicating with the driver/user. Head Unit 851 also includes a multiplexed transmit and receive Serial Interface 863 to the Antenna System, connected to said Antenna System 850 via Twisted Pair 833, as shown. The serial antenna interface also provides power to the Antenna System which may be provided by separate power (5 VDC) and ground (GND) wires as shown in FIGS. 8A and 8B, or may be provided over the Twisted Pair 833 serial communication wires themselves to reduce the total wires in the interface. The MCU is connected to a User Interface 875 which enables control of the SAT receiver (Channel Change, Volume, etc.) and certain outgoing messages on the V2V channel, as well as the display of information received from Antenna System 850, such as, for example, SAT receiver audio information, V2V situational awareness information (warnings, road information, etc.) or navigation information. MCU 865 is connected to an audio interface, Codec DAC 880, which includes speakers 890 for SAT audio or V2V related audio (speech information or tones) and may include a microphone 895 for cell communications or other audio applications. MCU 865 is also connected to Vehicle Bus 870 for collecting vehicle information such as braking status, steering wheel angle and other information which may be needed by a V2V system or other systems, as for example, are described in the V2V PCT Application. This interface may also be used to communicate information from Antenna System 850 to other vehicle systems such as, for example, providing imminent collision data to an ADAS system.

The exemplary system of FIGS. 8A and 8B is thus simply an augmented version of that of FIGS. 1-4, and the techniques of the present invention may be used with either exemplary system.

Exemplary Systems

In exemplary embodiments of the present invention, any suitable programming language can be used to implement the routines of particular embodiments, such as, for example, C, C++, Java, JavaScript, Python, Ruby, CoffeeScript, assembly language, etc. Different programming techniques may be employed such as procedural or object oriented programming. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage device or non-transitory computer readable medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

Particular embodiments may, as noted, be implemented in an SDARS receiver, in combination with V2V equipment. Such equipment may include hardware, software, middleware and firmware, as maybe appropriate.

It will also be appreciated that one or more of the elements depicted in the drawings can also be implemented in a more separated or integrated manner, or even removed or rendered as inoperable in certain cases, as is useful in accordance with a particular application. It is also within the spirit and scope to implement a program or code that can be stored in a machine-readable medium, such as a storage device, to permit a computer to perform any of the methods described above.

As used in the description herein and throughout any claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although various methods, systems, and techniques have been described herein, the scope of coverage of this patent is not limited thereto. To the contrary, the present invention is understood to cover all methods, systems, algorithms and articles of manufacture fairly falling within the scope of the appended claims. Thus, the above-presented description and figures are intended by way of example only and are not intended to limit the present invention in any way except as set forth in the following claims. It is particularly noted that the persons skilled in the art can readily combine the various technical aspects of the various elements of the various exemplary embodiments that have been described above in numerous other ways, all of which are considered to be within the scope of the invention.

What is claimed:

1. A method, comprising:
storing a large number of encrypted, device specific authentication certificates for one or more types of devices in an in-vehicle vehicle-to-vehicle (V2V) device;
receiving, at a satellite receiver in the vehicle and over a satellite channel, unlock codes corresponding to at least one certificate of the authentication certificates, the satellite receiver communicably connected to the V2V device;
providing the unlock codes to the V2V device; and
computing, in the V2V device and based on the unlock code provided by the satellite receiver, an unlock key for a current validity time window of the at least one certificate.

2. The method of claim 1, wherein the satellite receiver device is a satellite digital audio radio service (SDARS) receiver in a vehicle.

3. The method of claim 1, wherein the satellite receiver receives unlock codes for a a next validity time window.

4. The method of claim 1, further comprising the V2V device first requesting the unlock codes from the satellite receiver and in response the satellite receiver providing the unlock codes to the V2V device.

5. The method of claim 1, wherein the satellite control channel can further shut down disbursement of unlock codes to rogue V2V units.

6. The method of claim 5, wherein unlock codes are requested from a satellite receiver if a relevant Roadside Unit (RSU) is not available.

7. The method of claim 1, wherein prior to installation into a vehicle, an SCMS provides a chip within the V2V device with credentials including (i) a unique V2V ID, (ii) a unique secret key, and (iii) a group ID.

8. The method of claim 7, wherein said credentials are stored in at least one of one-time programmable (OTP), on-chip flash memory, and in package non-volatile memory.

9. The method of claim 7, further comprising:
receiving, at the satellite receiver and over the satellite channel, a revoke services message including an array of V2V IDs;
determining that the unique V2V ID of the V2V device is included in the array of V2V IDs; and
terminating unlock services for the V2V device.

10. The method of claim 1, wherein the unlock code is calculated is V2V device specific, and is a function of a group code common to a plurality of devices and a unique vehicle ID.

11. The method of claim 1, wherein a predetermined number of the authentication certificates correspond to each validity time window.

12. The method of claim 1, wherein the computing the unlock key is further based on a unique secret key associated with the V2V device.

13. A system for unlocking authentication certificates in a vehicle, comprising:
a vehicle, provided with:
a satellite reception device; and
a (vehicle-to-vehicle) V2V communications module communicably connected to the satellite reception device, comprising a memory,
wherein, in operation, the satellite reception device:
receives a plurality of device specific authentication certificates,
provides the plurality of authentication certificates to the V2V communications module,
receives at least one unlock code corresponding to at least one of the plurality of authentication certification over a satellite communications channel, and
provides the at least one unlock code to the V2V communications module, and the processor in the V2V communications module computes an unlock key for a current validity time window of the at least one certificate from the unlock code provided by the satellite receiver.

14. The system of claim 13, further comprising storing the plurality of encrypted, device specific authentication certificates in the memory.

15. The system of claim 14, wherein the device specific authentication certificates are for one or more types of devices.

16. The system of claim 14, wherein the plurality of encrypted certificates comprise N certificates, where N=(number of certificates per window)*(number of windows).

17. The system of claim 14, wherein the plurality of encrypted certificates is encrypted with a device specific and time period specific key.

18. The system of claim 13, wherein the V2V communications module computes the unlock key further based on a unique secret key associated with the V2V communications module.

19. The system of claim 13, wherein the V2V communications module is associated with credentials including a unique V2V ID and a group ID.

* * * * *